Nov. 24, 1936.  E. B. JORGENSEN  2,061,943
CONCRETE VIBRATOR MECHANISM
Filed Jan. 21, 1936

ENOCH BERG JORGENSEN.
INVENTOR.

BY
ATTORNEY.

Patented Nov. 24, 1936

2,061,943

UNITED STATES PATENT OFFICE 2,061,943

CONCRETE VIBRATOR MECHANISM

Enoch Berg Jorgensen, Los Angeles, Calif., assignor to Viber Company, Limited, a corporation of Nevada Application January 21, 1936, Serial No. 60,127

6 Claims. (Cl. 259—1)

My invention relates to machines for vibrating cementitious mixtures such as concrete, and the objects of my invention are to provide a vibratory mechanism which may be inserted within the unset concrete and which produces high frequency radial vibrations of low amplitude. It is another object of my invention to provide an improved vibrating machine which will place and compact a given mass of concrete in less time than has heretofore been possible. Still another object of my invention is to provide an unbalanced shaft assembly which under rotation gives vibrational energy of such a character that greatly increased vibrational efficiency in the settling of concrete results. Another object of my invention is to provide more than one elongated eccentric weight on a shaft arranged between bearings to prevent undue wear of the bearings. Still another object is to provide elongated eccentric weights on a shaft which can be positioned lengthwise of the shaft to control the character of the vibration, and the position of maximum and minimum vibration in the machine. These and other objects will be apparent from the description and drawing, in which Fig. 1 is a side elevation partly in section showing one form of my improved vibrating mechanism;

Fig. 2 is a cross-section taken on the line 2—2 of Fig. 1 showing in detail the improved construction;

Fig. 3 is a cross-section taken on the line 3—3 of Fig. 1.

Figures 1, 4, 5, 6:
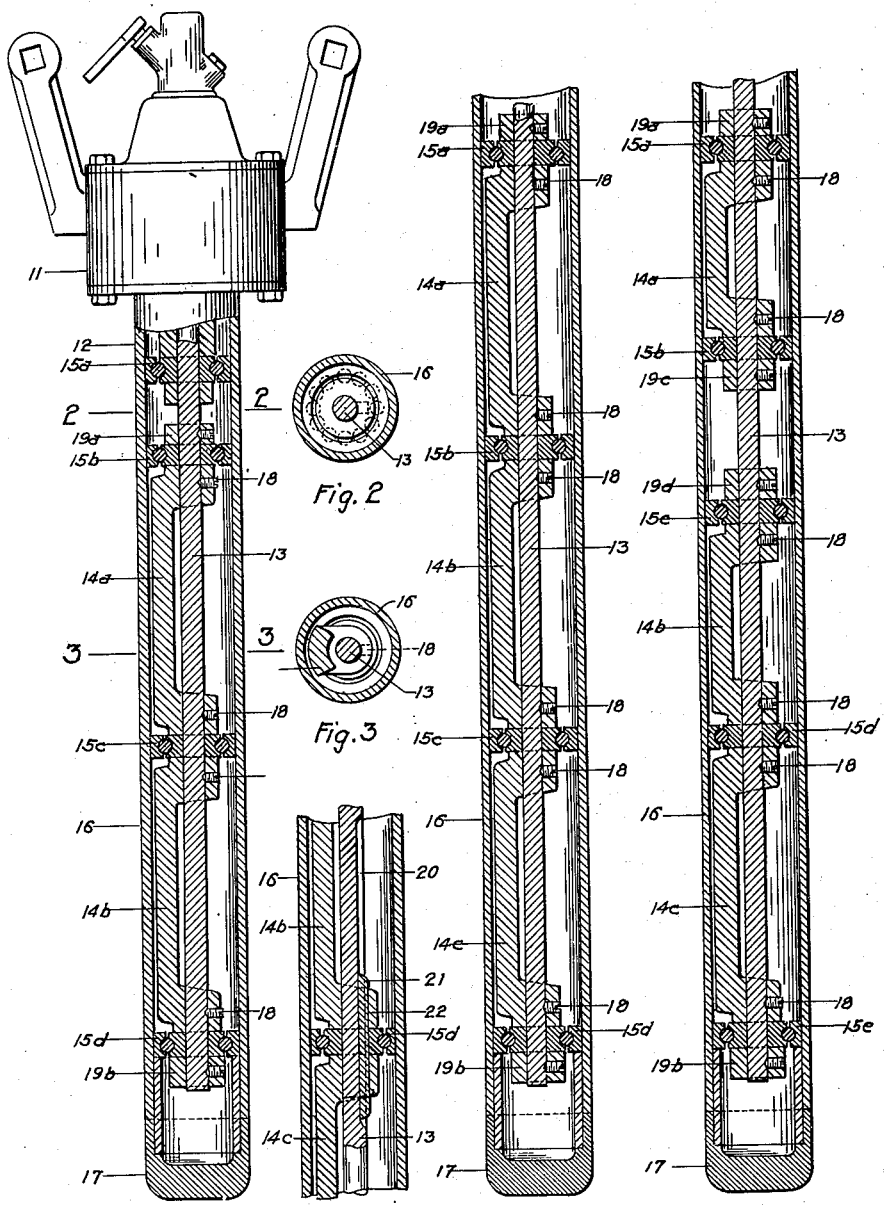
Fig. 4 is a section showing in detail the eccentrically weighted shaft system of another form of my invention.
Fig. 5 is a section showing still another arrangement of weights in the eccentrically weighted shaft system of my invention.
Fig. 6 shows details in section and alternative means of attaching the weights to the shaft.

In general, my vibrating machine comprises a high-speed rotary means 11, a rotary vibratory mechanism 12 consisting of an elongated shaft 13 to which are attached two or more elongated eccentric weights 14a, b, c, d, etc. and bearings 15a, b, c, d, etc. disposed along the shaft and supported by tubular casing 16 having a nose piece 17 at its free end, and being attached to the motor means at its opposite end. Any suitable high-speed rotary means may be used to rotate the eccentrically weighted shaft system, that shown as 11 being an air motor. The elongated shaft 13 is coupled in any suitable manner to the shaft of the rotary means. The casing 16 for the shaft and weight system is an elongated metallic cylinder having sufficient flexibility to permit it to be flexed and moved by the vibrations set up when the eccentrically weighted shaft system is rotated. This case 16 acts as a support for the bearings 15a, b, c, d, etc. for the shaft, which are preferably ball bearings, the outer collar of the ball bearing assembly having preferably a slip fit in the casing 16, although they may be attached to the casing by shrinking in, or other suitable manner. The bearings are placed at suitable positions along the shaft and between the eccentric weights, in which position they permit the operation of the shaft at high speeds with the consequent generation of radial vibrations, with only small frictional losses, and with greatly increased life in the bearings in comparison with the use of a single elongated weight with bearings at its ends only. Depending upon the weight of the eccentric load, and upon the length of the casing, I may use two weights with bearings at the ends and between them, as shown in Fig. 1, or three weights as shown in Fig. 2, or any number of weights. The elongated eccentric weights 14a, b, c, d etc. may be of equal masses, or of different masses, and may be of different lengths and shapes. They may be permanently attached to the shaft 13, or part of them may be permanently attached to the shaft, or they are preferably all or part fitted with set screws 18, or with other suitable detachable means for adjustably positioning each weight as desired along the shaft. In Fig. 6, keys 21 fitting in keyways 22 in the weights and in elongated keyseats on the shaft illustrates one other means of adjustably attaching the weights to the shaft.

In order to hold the bearings in place lengthwise of the casing, if the bearings are of the slip-fit type fitting within the casing 16 in the preferred manner described above, then collars, 19a, b, c, d, etc. having means for adjustable attachment to the shaft 13 are provided near the ends of the shaft, or between separate weights, the latter as shown in Fig. 5. I have found that the character of the vibrations produced by an eccentrically weighted elongated shaft within a vibratile casing which supports bearings for the shaft system, and the location of the zones of maximum and minimum intensities of vibration may be definitely controlled by adjusting by trial the relative positions of the eccentric weights lengthwise on the shaft. I prefer to have all of the weights placed parallel on the shaft, that is in the same angular position relative to the rotation of the shaft, since it appears from my experience that this arrangement of the weights on the shaft produces the most powerful type of vibration for my purposes.

The eccentrically weighted shaft supported in the bearings positioned between the several weights and at their ends, as above described, when rotated at high speed, produces vibrations which are transmitted to the vibrator casing 16 through the bearings, and by the casing to the unset concrete or other plastic mixture in which the vibrator may be inserted and be operating. Many factors enter into the character of vibration and the positions of maximum and minimum vibration as developed during the operation of a machine of the general type described. The speed of rotation, the stiffness of the outside tube or casing, the stiffness of the shaft, the weight and center of gravity of the eccentric load, and the distribution of this eccentric load along the shaft, the number and positions of the bearings, all have inter-related effects upon the type and amount of vibration produced in the external casing of the vibrator. The full adjustability of eccentric weight positions, in accordance with my invention, permits the control of this vibration, both in position of zones of maximum and minimum vibration, and as to amplitude of vibration. The former is of importance in keeping the maximum vibration zone near the insertable end of the machine, and the minimum vibration zone near the motors or handles; while the optimum amplitude of vibration is extremely important in the use of these machines for settling and compacting concrete of different kinds and in different masses and conditions. It is believed that high frequency and low amplitude are desirable, but there are undoubtedly limits to these, which are controllable by the means of this invention.

By adjusting the weights as described, my improved vibrator has given from ten to twenty percent greater efficiency over similar vibrators having a single weight. In addition, a machine made according to my invention, and properly adjusted, has greater durability because the vibration is "smooth" and the maintenance, particularly of the bearings, is much reduced.

While I have given this explanation of the action of my improved vibrator mechanism, and have shown preferred embodiments, I do not limit myself to these particular forms, but restrict my invention only in so far as is necessitated by the prior art and by the spirit of the appended claims.

I claim:

1. In a vibrator having an unbalanced weight shaft and bearing assembly enclosed within a housing adapted to be inserted within an unset concrete mass for vibration of the same, multiple elongated eccentric weights adjustably positioned lengthwise on said shaft and adapted to rotate with said shaft.

2. In a vibrator having an unbalanced weight shaft and bearing assembly enclosed within a housing adapted to be inserted within an unset concrete mass for vibration of the same, multiple eccentric elongated weights adjustably positioned lengthwise on said shaft, and bearings for said shaft adjacent the ends of each of said weights.

3. In an unbalance-weight vibrating mechanism, an elongated shaft adapted for driving at one end, elongated multiple eccentric weights adapted to rotate with and adjustably disposed lengthwise on said shaft, and bearings for said shaft adjacent the ends of each of said eccentric weights.

4. In an unbalanced-weight vibrating mechanism enclosed within a housing adapted to be inserted within an unset concrete mass for vibration of the same, an elongated shaft, a plurality of eccentric elongated weights adjustably disposed along said shaft, and means for attaching said weights at selected positions onto said shaft.

5. In an unbalanced-weight vibratory mechanism, an elongated shaft adapted for driving at one end, a plurality of eccentric elongated weights adapted for rotation with said shaft, and means for maintaining the weights in selected positions lengthwise of said shaft.

6. In an unbalanced-weight vibrating mechanism, an elongated shaft adapted for driving at one end, a plurality of eccentric elongated weights disposed lengthwise on said shaft, means for attaching the weights for rotation with said shaft, bearings for said shaft interposed between said weights, and means for positioning the separate weights lengthwise along the shaft.

ENOCH BERG JORGENSEN.